H. Underwood,

Belt Fastener,

No. 2,433, Reissued Jan. 1, 1867.

Witnesses.

J. C. Coleman

J. W. Bliss

Inventor:

Henry Underwood

N. PETERS, PHOTO-LITHOGRAPHER, WASHINGTON, D. C.

UNITED STATES PATENT OFFICE.

P. JEWELL & SONS, OF HARTFORD, CONNECTICUT, ASSIGNEES OF HENRY UNDERWOOD, OF NEW YORK, N. Y.

IMPROVED LAP-JOINT.

Specification forming part of Letters Patent No. 19,318, dated February 9, 1858; Reissue No. 2,433, dated January 1, 1867.

*To all whom it may concern:*

Beit known that we, PLINY JEWELL, PLINY JEWELL, Jr., and MARSHALL JEWELL, of the city and county of Hartford, and State of Connecticut, are assignees of HENRY UNDERWOOD, of the city, county, and State of New York, who did invent a new and useful Improvement in Fastenings for Lap-Joints for Machine-Belting; and we do hereby declare that the following is a full, clear, and exact description of the same, reference being had to the annexed drawings, making a part of this specification, in which—

Figure 2:
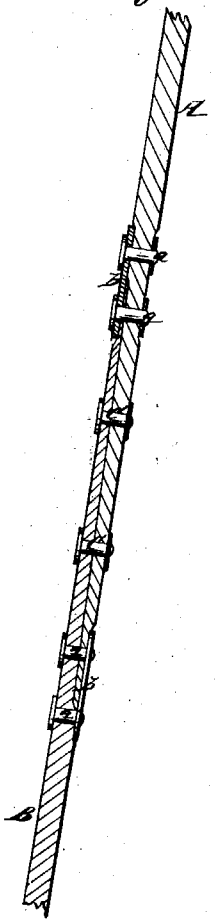
Figure 3:
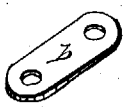
Figure 1:
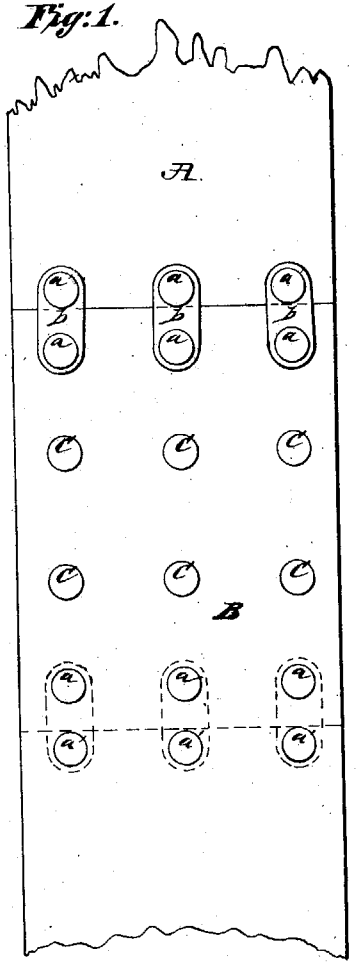

Figure 1 is a front face view of a joint constructed or formed with fastenings according to this invention. Fig. 2 is a longitudinal section of the same. Fig. 3 is a detached view of one of the metal straps or plates.

The nature of this invention consists of the union of a plate or strap with rivets, for securing lap-joints or chamfered or "skived" ends of two pieces of belting.

This invention is designed to prevent the ruffling or turning up of the outer ends of the laps, which is generally caused by the friction produced as the joint passes over pulleys, drums, &c., and also to prevent the cutting of the thin outer ends of the lap by the heads of the rivets, in case the cement loses its adhesive property or gives way, and the connection thereby formed solely by the rivets.

To enable those skilled in the art to fully understand and construct said invention, we will proceed to describe it.

A B represent the two ends of a belt or two pieces of belting. The ends of these two parts are chamfered or skived and cemented and lapped in the usual way, so that the parts A B at their junction will be of the same thickness as at other parts.

C represents rivets of the usual form, which pass through the chamfered ends, and serve, in addition to the cement, to secure the central portion of the joint.

The extreme ends of the chamfered or skived parts are secured firmly together by the unity of the rivets *a a'*, with the plates or strap *b*. The rivets *a* pass through the thin outer end of one lap and through the thick inner end of the other, and the rivets *a'* pass through the thick inner ends of one of the laps and quite near the thin end of the other (See Fig. 2.) The plate or straps *b*, which form the union with the rivets *a a'*, (as effectually as if the plate and rivets were made of one and the same piece of metal,) extend over the outer and thin ends of the laps. Theses traps are united with the rivets so as to firmly clasp the chamfered or skivedends of the two parts of a belt, as shown clearly in Fig. 2. The form or shape of one of the plates or straps, as usually employed, is shown clearly in Fig. 3.

By referring to Fig. 1 it will be seen that the rivets are placed transversely in rows of three each but they may be placed nearer each other, if desired, and more rivets may be used.

The plates or straps *b*, in consequence of projecting over the ends of the laps, protect their ends, (the lap ends,) and prevent them from being turned up. They also, in case the cement gives away, or, from any other cause, loses its adhesive property, and the strength of the joint depends solely on the rivets, prevent the heads of the rivets from cutting through the laps. This cutting of the laps near their thin ends by the heads of the rivets generally occurs when the cement gives way, for when the belt is in use, the rivets, owing to the strain to which the belt is subjected, are canted or turned out of right-angular position relatively with the sides of the belt, and the heads of the rivets readily cut through the laps near their outer ends, on account of being quite thin at those parts. It will be clearly seen that the plates or straps *b*, in unity with the rivets, (whether made in one piece of metal or in three parts,) will prevent this as there are no heads allowed to come in contact with the belt at the outer ends of the laps, and the plates or straps also bind firmly the thick and thin portions of the laps together, so that the thin outer edges of the same cannot be turned up or parted from the inner and thicker ends.

This improvement (the union of the plate *b* with the rivets *a a'*) also allows of the ends of the laps being made thick or thin, at pleasure, without detriment to their strength, and does not render cement absolutely necessary to make a strong, durable joint.

In case a belt is exposed to wet, the rivets and plate, in union with each other, may be used alone for fastening the joint.

Having thus described said invention, what we claim as new, and desire to secure by Letters Patent, is—

The union of the plate or strap *b* with the rivets *a a'*, which pass through the outer and inner ends, A B, of the belt, substantially as and for the purpose described.

PLINY JEWELL,
PLINY JEWELL, JR.,
MARSHALL JEWELL,
*Constituting the firm of P. Jewell & Sons.*

Witnesses:
J. E. COLEMAN,
J. W. BLISS.